(12) United States Patent
Fong et al.

(10) Patent No.: US 8,498,890 B2
(45) Date of Patent: Jul. 30, 2013

(54) PLANNING AND ORCHESTRATING WORKFLOW INSTANCE MIGRATION

(75) Inventors: Liana L. Fong, Irvington, NY (US); David C. Frank, Ossining, NY (US); Linh H. Lam, Yorktown Heights, NY (US); Zhi Le Zou, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 672 days.

(21) Appl. No.: 12/562,487

(22) Filed: Sep. 18, 2009

(65) Prior Publication Data

US 2011/0071876 A1  Mar. 24, 2011

(51) Int. Cl.
*G06Q 10/00* (2012.01)
(52) U.S. Cl.
USPC .......................... 705/7.27; 709/201; 718/100
(58) Field of Classification Search
USPC ... 705/7.27; 709/201, 312; 718/100; 711/202
See application file for complete search history.

(56) References Cited

U.S. PATENT DOCUMENTS

| | | | | |
|---|---|---|---|---|
| 6,145,066 | A  * | 11/2000 | Atkin | 711/165 |
| 6,338,147 | B1 * | 1/2002 | Meth et al. | 714/13 |
| 6,769,121 | B1 * | 7/2004 | Koyama et al. | 718/100 |
| 7,386,552 | B2 * | 6/2008 | Kitamura et al. | 1/1 |
| 7,406,424 | B2 | 7/2008 | Cheeniyil et al. | |
| 7,583,590 | B2 * | 9/2009 | Sivakumar et al. | 370/217 |
| 8,121,877 | B2 * | 2/2012 | Chang et al. | 705/7.11 |
| 8,171,267 | B2 * | 5/2012 | Lee | 712/225 |
| 2003/0055697 | A1 * | 3/2003 | Macken et al. | 705/7 |
| 2003/0078957 | A1 * | 4/2003 | Cheeniyil et al. | 709/201 |
| 2004/0055004 | A1 | 3/2004 | Sun et al. | |
| 2007/0239774 | A1 * | 10/2007 | Bodily et al. | 707/103 R |
| 2008/0196027 | A1 * | 8/2008 | Hohmann et al. | 718/100 |

OTHER PUBLICATIONS

Method and Apparatus for Business Process Migration based on Projections and Customizable Plans, IBM, IPCOM000167566D, Feb. 20, 2008, p. 1-4.*
Kradolfer and Geppert, Dynamic Workflow Schema Evolution Based on Workflow Type Versioning and Workflow Migration. CoopIS '99 Proceedings, 1999, p. 1-11.*
Claypool and Finkel, Transparent Process migration for Distributed Applications in a Beowulf Cluster, 2002, p. 1-9.*
Milojicic et al., Process Migration, ACM Computing Surveys, vol. 32, No. 3, Sep. 2000, p. 241-299.*

(Continued)

*Primary Examiner* — Justin M Pats
(74) *Attorney, Agent, or Firm* — Jose Gutman; Fleit Gibbons Gutman Bongini & Bianco PL

(57) ABSTRACT

A method and information processing system manage workflow instance migration. An initial workflow process model is compared with a new workflow process model. A set of differences between the initial workflow process model and the new workflow process model are determined. At least one set of activities associated with the initial workflow process model that is migrateable to the new workflow process model is identified based on the set of differences. A migration plan associated with the initial workflow process model and the new workflow process model is generated. The migration plan includes the at least one set of activities associated with the initial workflow process model. The migration plan is then used to evaluate a set of workflow instances associated with the initial workflow process model and migrate one or more of these workflow instances to the new workflow process model based thereon.

4 Claims, 10 Drawing Sheets

OTHER PUBLICATIONS

Uhruski and Onderka, The Object Oriented Platform for the Process migration in the Heterogeneous Networks, Schedae Informaticae, vol. 11, 2002, p. 99-114.*
Shub, Native Code Process-Originated Migration in a Heterogenous Environment, 1990 ACM, p. 266-270.*
Zheng et al., Multiple Flows of Control in Migratable Parallel Programs, p. 1-13, 2006.*
Li, IVY: A Shared Virtual Memory System for Parallel Computing, 1988, p. 94-101.*
Joeris and Herzog, Managing Evolving Workflow Specifications With Schema Versioning and Migration Rules, 1999, p. 1-25.*
Milokici et al., Process Migration, HP Labs, Aug. 10, 1999, p. 1-49.*
IBM, Websphere MQ Workflow to WebSphere Process Server Transition, Example of a customer process instance migration, Jun. 2009, p. 1-27.*
Ellis and Keddara, A Workflow Change is a Workflow, LNCS 1806, 2000, p. 201-17.*
Ip.com Document ID: IPCOM000167566D, "Method and Apparatus for Business Process Migration based on Projections and Customizable Plans, Feb. 20, 2008."
Yang, et al., "Workflow Instances Migration Approach Based on State," Jisuanji Jicheng Zhizao Xitong/Computer Integrated Manufacturing System, ISSN: 1006-5911, v. 14, n. 2, p. 372-378, Feb. 2008.
Li et al., "Research on Correctness Criteria for Process Instance Migration," Jisuanji Gongcheng yu Yingyong, Computer Engineering and Applications, ISSN: 1002-8331, v. 42, n. 36, p. 7-9, Dec. 2007.
Li, et al., "Process Evolution Based on Change Domains," Xi'an Jiaotong Daxue Xuebao, Journal of Xi'an Jiaotong University, ISSN: 0253-987X, v. 41, n. 12, p. 1406-1410, Dec. 2007.
Kradolfer, M., et al., "Dynamic Workflow Schema Evolution Based on Workflow Type Versioning and Workflow Migration," Cooperative Information Systems, 1999, COOPIS ' 99 Proceedings, 1999 IFCIS International Conference on Edinburgh, UK, Sep. 1-4, 1999, Los Alamitos, CA, USA, IEEE Comput. Soc., US, Sep. 2, 1999, pp. 104-114, XP010351846, ISBN: 0-7695-0384-5.
Milojicic, Dejan S., et al., "Process Migration," ACM Computing Surveys, vol, 32, No. 3, pp. 241-299, Sep. 2000, ISSN:0360-0300.

* cited by examiner

PLANNING AND ORCHESTRATING WORKFLOW INSTANCE MIGRATION

FIELD OF THE INVENTION

The present invention generally relates to workflow systems, and more particularly relates to migrating workflow instances.

BACKGROUND OF THE INVENTION

Workflow systems typically have a process model with multiple instances which are concurrently operating according to this model. If the process needs to be modified a new process model is deployed and new instances can be created with the new model. However, existing instances created by the earlier model generally must run to completion against their creation model version. This structure means that while new instances will pick up the process modifications, prior instances usually must continue to run against the earlier process model. Long running processes, which run for weeks or even months, emphasize this challenge because of the long time periods during which the old and new models can overlap. The limitation that instances generally must run to completion against the creation model is a significant impediment to the adaptability of the workflow model. The nature of long running processes means that it is possible that during the lifetime of a running process instance changes to the process model may be required.

SUMMARY OF THE INVENTION

In one embodiment, a computer implemented method for managing workflow instance migration is disclosed. The computer implemented method comprises comparing an initial workflow process model with a new workflow process model. A set of differences between the initial workflow process model and the new workflow process model are determined. At least one set of activities associated with the initial workflow process model that is migrateable to the new workflow process model is identified based on the set of differences. A migration plan associated with the initial workflow process model and the new workflow process model is generated. The migration plan comprises the at least one set of activities associated with the initial workflow process model.

In another embodiment, an information processing system for managing workflow instance migration is disclosed. The information processing system comprises a memory and a processor communicatively coupled to the memory. A migration manager is communicatively coupled to the memory and the processor. The migration manager compares an initial workflow process model with a new workflow process model. A set of differences between the initial workflow process model and the new workflow process model are determined. At least one set of activities associated with the initial workflow process model that is migrateable to the new workflow process model is identified based on the set of differences. A migration plan associated with the initial workflow process model and the new workflow process model is generated. The migration plan comprises the at least one set of activities associated with the initial workflow process model.

In yet another embodiment, a computer implemented method for managing workflow instance migration is disclosed. The computer implemented method comprises receiving a migration plan indicating a set of workflow migration points associated with an initial workflow process model that is migrateable to a new workflow process model. The set of workflow migration points is associated with a set of workflow activities of the initial workflow model. A least one workflow instance is selected from a set of workflow instances. Each workflow instance in the set of workflow instances is an instantiation of the initial workflow process model and is operating at least one of activity in the initial workflow process model. A current migrateability state associated with the workflow instance that has been selected is determined based at least on the set of workflow migration points. Migration of the workflow instance to the new workflow process model is granted in response to determining that the current migrateability state is set to migrateable. Migration of the workflow instance to the new workflow process model is prevented for at least a given amount of time in response to determining that the current migrateability state fails to be set to migrateable.

In another embodiment, an information processing system for managing workflow instance migration is disclosed. The information processing system comprises a memory and a processor communicatively coupled to the memory. A migration manager is communicatively coupled to the memory and the processor. The migration manager receives a migration plan indicating a set of workflow migration points associated with an initial workflow process model that is migrateable to a new workflow process model. The set of workflow migration points is associated with a set of workflow activities of the initial workflow model. A least one workflow instance is selected from a set of workflow instances. Each workflow instance in the set of workflow instances is an instantiation of the initial workflow process model and is operating at least one of activity in the initial workflow process model. A current migrateability state associated with the workflow instance that has been selected is determined based at least on the set of workflow migration points. Migration of the workflow instance to the new workflow process model is granted in response to determining that the current migrateability state is set to migrateable. Migration of the workflow instance to the new workflow process model is prevented for at least a given amount of time in response to determining that the current migrateability state fails to be set to migrateable.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention, in which.

DETAILED DESCRIPTION

Figure 1:
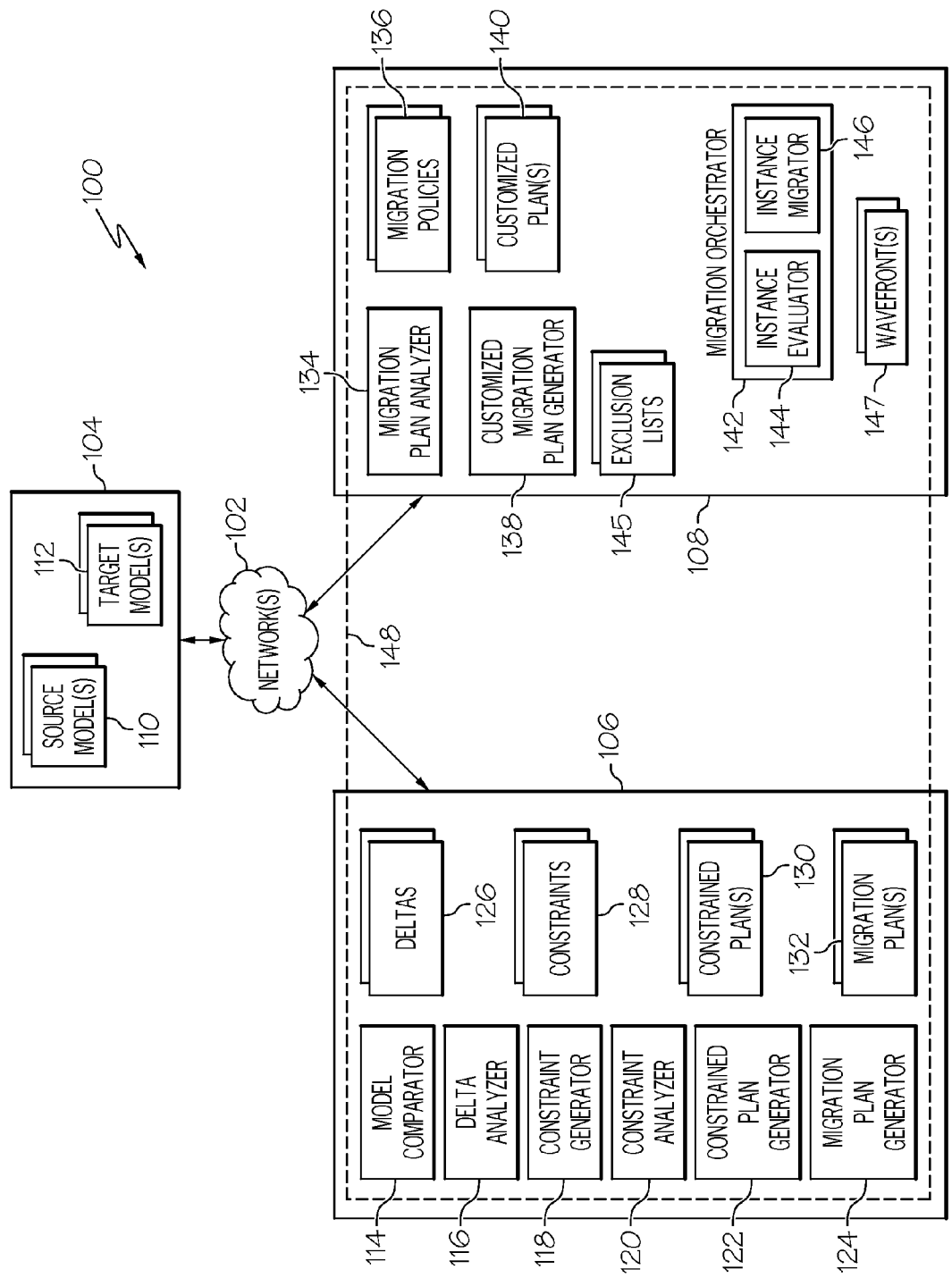
FIG. 1 is a block diagram illustrating one example of an operating environment according to one embodiment of the present invention.

As required, detailed embodiments of the present invention are disclosed herein; however, it is to be understood that the disclosed embodiments are merely examples of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure and function. Further, the terms and phrases used herein are not intended to be limiting; but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. Plural and singular terms are the same unless expressly stated otherwise.

Workflow application developers and system providers have adopted a variety of strategies to try to insulate their processes from the effects of change. For example, a single logical workflow can be broken into dynamically reassembled pieces. This externalizes key parameters of the process into business rules, which can be changed on the fly, etc. However, it is impractical to design any, but the most trivial, workflow anticipating all the potential unforeseen changes that may be needed at some point in the future. Most workflow developers, regardless of the work-arounds that are employed, will be faced with a situation where they will want to adapt pre-existing long running instances to new model changes.

Managing migration in a production environment with complex process models, and with hundreds or thousands of instances of business critical applications while maintaining continuous availability is a challenging problem. In order to determine whether any given instance is migrateable from one process model to another, the run-time needs an in depth understanding of both process models. Any migration solution generally must deal with a broad range of processes: process lifetimes can span several orders of magnitude, need to be always available and may need to follow strict compliance rules. At any given time only a fraction of instances may be in a migrateable state; instances which cannot be migrated may be migrateable at some point in the future. (Any migration model should not disrupt the continuous availability of the process.)

Various embodiments of the present invention provide a processes migration model as a policy driven continuous, long running, process. The data necessary to evaluate whether any instance is currently migrateable at model creation time is captured and conveyed to the run-time environment in a migration plan. A migration administrator can define migration policies, which configure the continuous migration process. The continuous migration model explicitly addresses the four main problems of managing migration: scheduling, orchestration, evaluation, and execution. Designing migration as a continuous process itself enables process instance migration to be performed across models; maintain continuous process availability; and deliver a powerful, flexible migration model which can deal with a broad range of migration scenarios. Using a policy model to fine tune the run-time migration behavior means that the same model's migration plan can be reused as migration requirements change over time.

Operating Environment

According to one embodiment, FIG. 1 illustrates one example of an operating environment/system 100 for managing workflow instance migration. It should be noted that although FIG. 1 shows various components distributed on various information processing systems, one or more of these components can reside on the same system or another system. In another embodiment, all of these components can reside on a single system as well. FIG. 1 shows one or more networks 102 that, in one embodiment, are wide area networks, local area networks, wired networks, wireless networks, and/or the like. In one embodiment, the environment 100 includes a plurality of information processing systems 104, 106, 108 that are communicatively coupled to the network(s) 102.

In one embodiment, one information processing system 102 includes one or more source process models 110 and one or more target process models 112. The source model 110 can be an initial workflow process model and the target model 112 can be a new or revised version of the source model 110. In one embodiment, a workflow model 110, 112 is made up of a sequence of activities, which are the discrete steps of the workflow model. A workflow model (e.g. bpel) has a variety of different activity types that the developer uses to create the workflow model. For example, one activity can invoke a service to obtain a customer's credit score, another activity can wait for a response, and a human task activity can wait for a human to approve/deny a credit request.

A workflow model can comprise branches, parallel flows, loops etc, all made up of discrete activities. At run time a workflow system can support multiple instances of the workflow that are simultaneously running against the model. Each instance is running independent of the other instances and can be operating at different points in the workflow. If a snapshot (wavefront 147) is taken of the state of any given instance it will be at some point in the workflow model, i.e., operating one or more activities. The wavefront snapshot for an instance indicates where in the model that instance is.

Since long running processes can run for very long times (days, weeks, even months) most of the time these instances are waiting for something to happen. Therefore, in one embodiment, the migration manager 148 migrates instances when they are in this activity waiting state. The instance is "running", but the activity is waiting for something to happen. However, other embodiments migrate instances in other states as well. So one instance is just the state of a particular "instance" of a workflow process model that is currently running and part of that state is what activity(s) it is currently "operating". As will be discussed in more detail below. A migration plan 132 identifies which activities in the model are potentially migrateable. The migration manager 148 checks the wavefront 147 against the migration plan 132 to determine whether this particular instance is migrateable (i.e., if all the activities, which form the current wavefront for that instance, are migration points according to the migration plan 132). If so the instance is migrateable and if not the instance is not migrateable. At any given time there can be many instances running simultaneously. The migration management operations discussed below iterate over the pool of instances.

Another information processing system 106 includes a model comparator 114, data analyzer 116, constraint generator 118, constraint analyzer 120, constraint plan generator 122, and a migration plan generator 124. An additional information processing system 108 comprises a migration plan analyzer 134, one or more migration policies 136, a customized migration plan generator 138, one or more customized plans 140, one or more exclusion lists 145, one or more wavefronts 147, and a migration orchestrator 142 comprising an instance evaluator 144 and an instance migratory 146.

Figure 2:
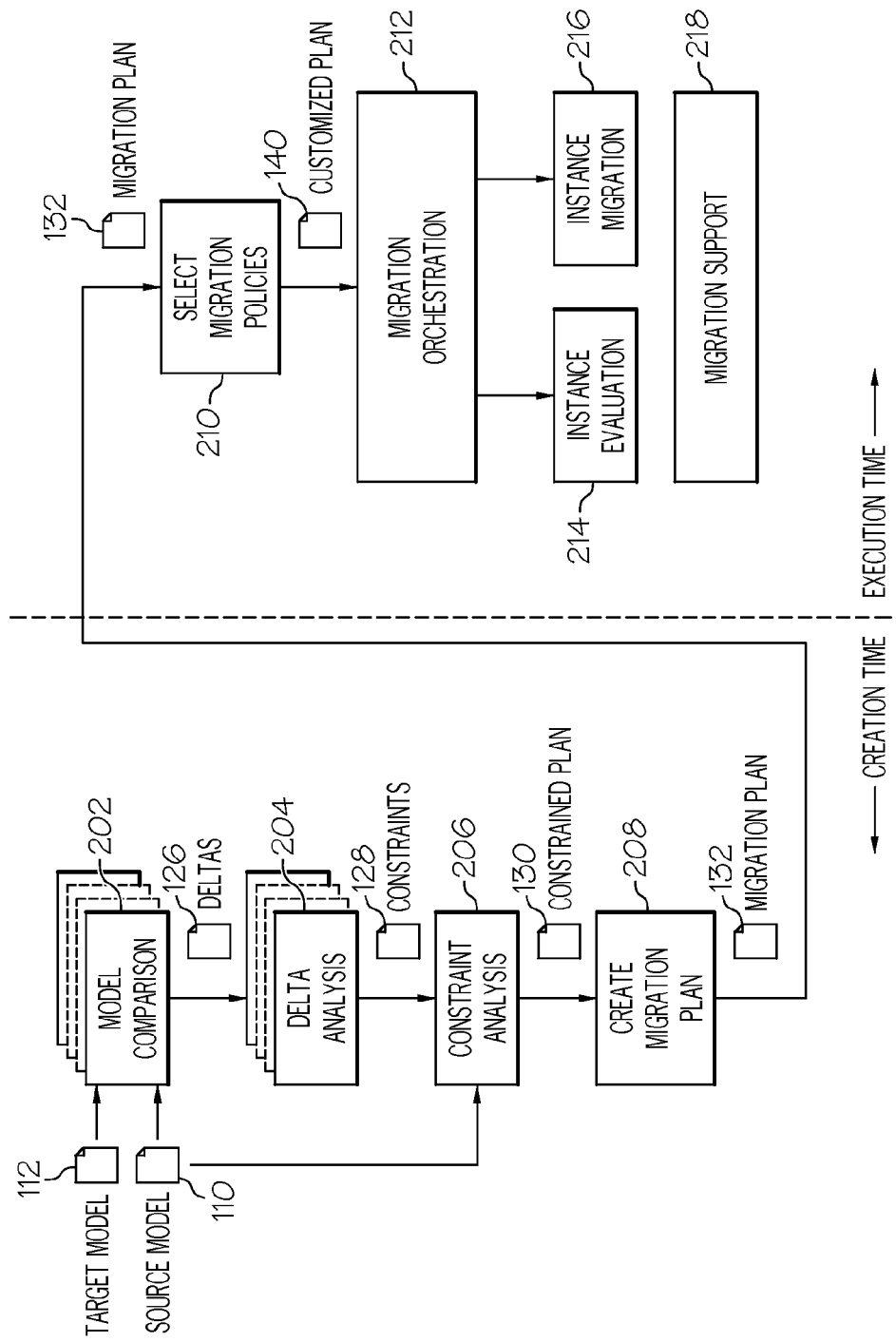
FIG. 2 illustrates an overall sequence flow for managing the migration of workflow instances according to one embodiment of the present invention.

FIG. 1 and the sequence flow of FIG. 2 will be discussed together to give a general overview of the migration management and orchestration provided by various embodiments of the present invention. In one embodiment, the model comparator 114 compares, at step 202, the migration source and target models 110, 112 to each other so that the regions of the source model 110 which are migration compatible with the target model 112 can be identified. This comparison generates one or more deltas 126 between the migration source and target models 110, 112. The deltas 126 represent the differences between the migration source and target models 110, 112. The present invention is not limited to one particular technique for identifying changes between process models. For example, the models 110, 112 can be compared across multiple dimensions such as, but not limited to control flow changes, data flow changes, choreography changes, attribute changes, and the like.

The delta analyzer 116, at step 204, analyzes the deltas 126, i.e. differences, and based on this analysis the constraint generator 118, at step 206, identifies the migration compatible region or regions in the source process model 110, referred to as constraints 128 or change constraints 128 and are used to create a constrained plan 130 by the constrained plan generator 122. The constrained plan 130, in one embodiment, comprises the constraints 128 and is used to identify the constrained activities (incompatible activities). Once the constrained activities are identified, the remaining activities (which are unconstrained) are the compatible activities, which are the candidates used form a migration point set.

A migration compatible region is a set of one or more activities (migration points) where if the process state was extracted from the source instance and used to create a new instance operating against the target model 112, the migrated instance would thenceforward operate correctly according to the target model 112. The deltas 126 are analyzed to identify change constraints 128 that constrain the regions of the source model 110 which are migrateable. The delta analysis techniques to identify dependencies between changes, in one embodiment, similarly minor the model comparison methods. Whatever the approach, the result of the comparison and analysis stages is to identify any change constraints.

The constrained plan 130 is used by the migration plan generator 124, at step 208, to package the migration points in a migration plan 132. The migration plan analyzer 134 analyzes the migration plan 132. A customized migration plan generator 138, based on the analysis of the migration plan 132, configures the plan 132, at step 210, with domain specific migration policies 136, which drive the execution of the migration plan 132. The migration plan configured with domain specific migration policies 136 can be referred to as a customized migration plan 140.

In practice, the model time analysis (model comparison and analysis, developer supplied supplemental information) is much more involved and costly in terms of time and effort than what is required to configure and initiate migration in the run-time environment. This asymmetry between the effort of model comparison and analysis compared with the effort to initiate migration means that it is preferable to compare/analyze once and operate as needed. Various embodiments use the run-time migration policies 136 to achieve very different migration behavior using a common migration plan 132. Migration policies 136 are also a way to capture and leverage process domain knowledge from the migration administrator. A few non-limiting examples of policies are given below in Table 1.

TABLE 1

| Policy | Controls |
|---|---|
| Scheduling | Enable or disable |
| | Time & duration of migration window |
| | Retry interval |
| | Expiration |
| Priority | High, medium or low |
| Exclusion | Skip or exclude |
| Passes | Single-Pass or Multi-Pass |
| Unmigrateable | Suspend or continue |
| Compliance Model | Strict or relaxed |
| Equivalent Migration | Enable or disable (trailing wavefronts) |
| Instance Filter | Enable or disable |
| | Filter variable, threshold, condition |
| | Filter scope (local/global) |

The migration orchestrator 142, via the instance evaluator 144 and the instance migratory 146, at step 212, accurately identifies whether source process instances are in a compatible or migrateable state as a necessary preliminary step to initiating migration. Migration support, at step 218, can then be carried out if needed. Migration support is implementation dependent. In general there is instance data associated with each running instance that is bound to the workflow template (model). Migration support can be referred to as whatever is needed to extract the instance data from the initial workflow context and use it to generate a new instance with the new workflow model. Since all the data for the instance is bound to the initial workflow model it needs to be re-associated with the new model, which is an implementation dependent process.

The components residing in information processing systems 106, 108 can collectively be referred to as a migration manager 148. Alternatively, the migration manger 148 can include only the components in system 106 or system 108, or one or more components from both systems 106, 108. As discussed above, one or more of the components discussed above residing within the information processing systems 104, 106, 108 can reside on the same system, a different system, or all of the components can reside on a single system.

General Overview

The need for migration is generally driven by the introduction of change. Depending on the change scenario, some scenarios can take advantage of migration; some can require migration. Since all change, including migration, inherently carries some risk, migration will probably be reserved for process change scenarios which directly motivate migration.

Process model errors (whether intrinsic to the model or arising from unforeseen external changes) can take advantage of migration to work around the problem. Without migration, running instances are doomed to repeat the same error when they reach the problem sequence. Instances that have not yet reached the problem section can be migrated to the new model; for instances that have already passed the problem section, migration is optional, these instances can continue to run against the original model or they can be migrated depending on preference. In the case of normal functional evolution, migration can allow running instances to take advantage of new functions However, without a specific compelling requirement for migration, there will be many change scenarios which will not need to be migrated. Compliance changes however, whether regulatory or business can effectively mandate migration. A new requirement for additional business logic which needs to be applied retroactively to already running workflow instances could require migration in order to remain in compliance. Just as not every process model change requires migration, not every instance of a process may need to be migrated. Changes may only apply to a subset of the running instances. For example, additional credit checking business logic may be needed, but only for loan amounts above a certain threshold. In this scenario, only those instances which match a certain filter policy need to be migrated; there may be no need to migrate the other instances.

Depending on the exact nature of the model changes, specific instance states (of the old process model, e.g., source model 110) may or may not be compatible with the new process model, e.g., target model 112. Various embodiments use the term "compatible state" to refer to a state of the old model 110 which, if migrated in that state to the new model 112, would behave correctly when resumed. In order to accurately evaluate the migrateability of any given old process instance, it is first necessary to understand which parts of the old process model 110 are compatible with the new process model 112.

The migration manager 148 uses the constraint model 130 to identify potential migration points in the source model 110 that are compatible with the new process model 112. In general, the migration manager 148 compares and analyzes process model changes to identify change dependencies which create migration constraints. These constraints can come from control flow changes, data flow changes, changes to the process choreography, or can be supplied by the migration developer (for example semantic changes).

Figure 3:
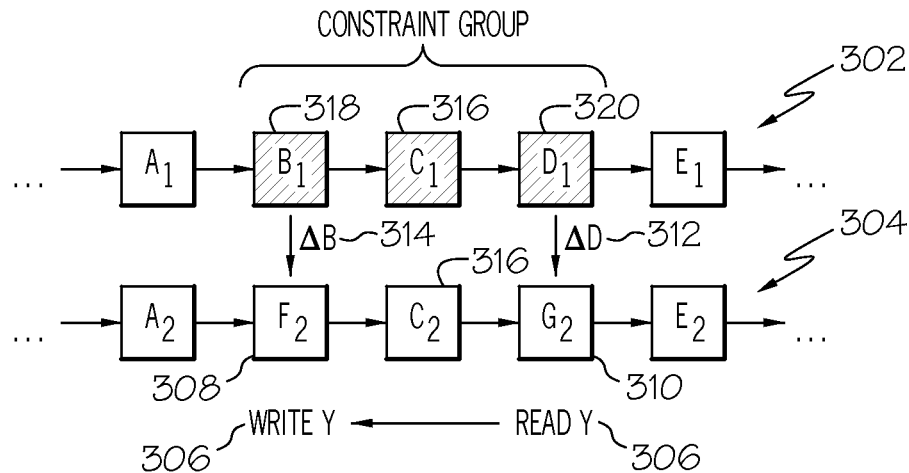
FIG. 3 illustrates a dataflow constraint example according to one embodiment of the present invention.

FIG. 3 illustrates a simple dataflow constraint example. The upper sequence 302 details a section of an old process model (e.g., source model). The lower sequence 304 corresponds to a new process model (e.g., target model). The new process model has a new variable, Y 306. Activity F 308 writes the new variable, which later in the sequence activity G 310 reads. In this example, ΔD 312 as depends on ΔB 314 and this dependency creates a migration constraint. For example, if a migration is attempted inside this constraint group at C 316 the migrated instance will fail at the new activity G 310 because variable Y 306 is undefined. The migration manager 148 determines that a migration can therefore occur before B 318 or after D 320, but not in between. Thus the dataflow constraint can be used to constrain which activities are potential migration points.

Figure 4:
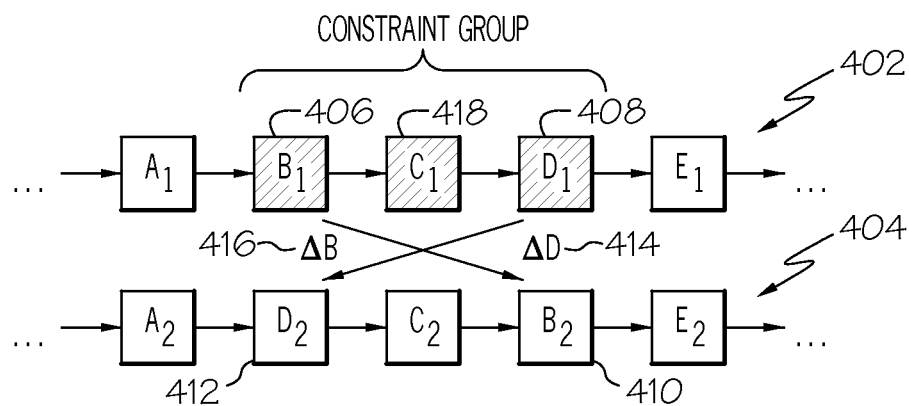
FIG. 4 illustrates a control flow constraint example according to one embodiment of the present invention.

FIG. 4 illustrates an example of a control flow constraint. In this example the order of execution has been changed by swapping the positions of the B and D activities 406, 408, 410, 412. ΔD 414 has a dependency on ΔB 416, which forms a dependency group. If migration is attempted at activity C 418 for example, the activity B 406, 410 is executed twice and activity D 408, 412 is never be executed. The migration manager 148 captures the migrateability knowledge in a migration plan 132, which identifies the activities in the source model 110 that are potential migration points. It should be noted that constraints types can be evaluated and/or determined at model time and/or at run-time. The migration manager 148 at runtime, in turn, uses this migration plan 132 to evaluate process instances. Evaluation to determine whether the instance is currently in a migrateable state is performed, in one embodiment, prior to the actual migration of the instance. The migration plan 132 captures the output of the model comparison and analysis and the relevant domain knowledge of the developer and specifies the states of the source process model 110 that are migrateable.

Figure 5:
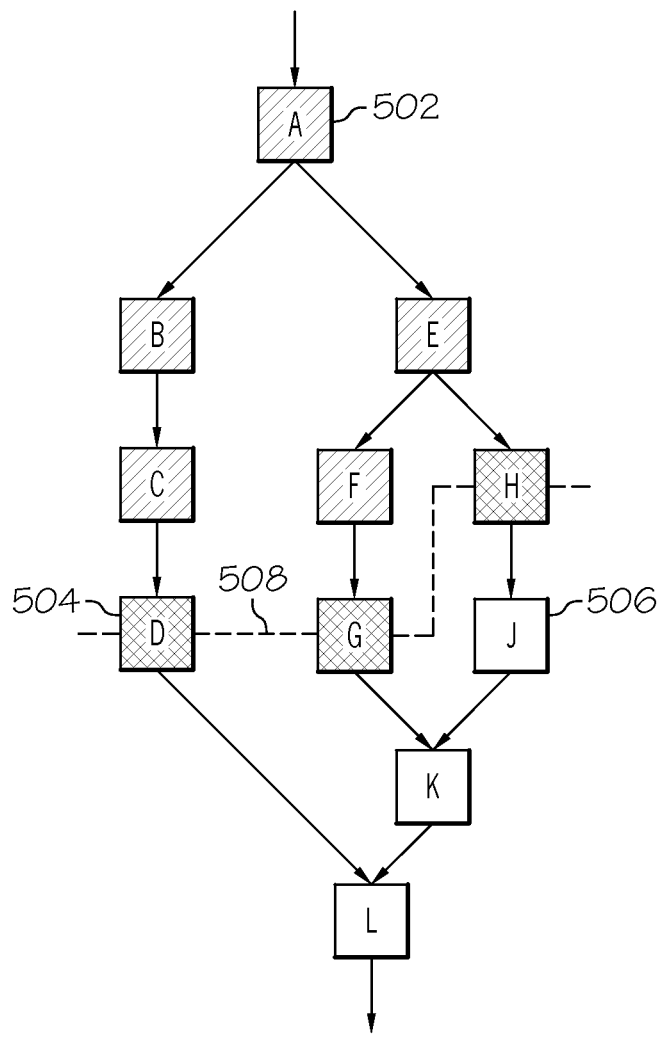
FIG. 5 shows one example of a wavefront according to one embodiment of the present invention.
Figure 5:
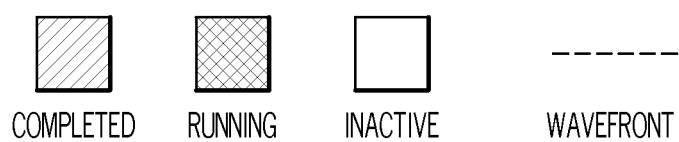

With respect to states of an instance, an activity wavefront 147 is a snapshot of the state of an instance. The wavefront is used, in part, by the migration manager 148 to determine the current state of an instance and to evaluate migrateability. For example, FIG. 5 shows one example of a wavefront. In particular, FIG. 5 shows a plurality of activities and where in the workflow the instance is operating. Activities with diagonal shading such as Activity A 502 have completed their operation. Activities with a shaded box such as Activity D 504 are running. Activities with a non-shaded box such as Activity J 506 are inactive. The dashed line 508 represents a wavefront.

Figure 6:
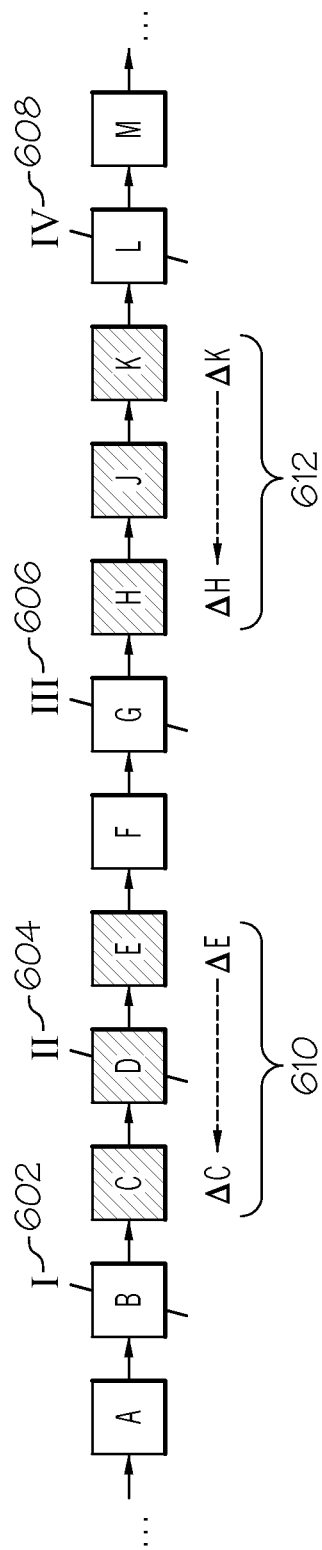
FIG. 6 illustrates four possible wavefront scenarios according to one embodiment of the present invention.

In one embodiment, migration behavior can vary depending on the wavefront's position relative to changes and change groups. In general, migrateable wavefronts can come before, between, or after change groups. FIG. 6 illustrates four possible wavefront scenarios. To distinguish between these scenarios at run-time each migrateable activity is annotated with positional attributes that specify whether this activity is leading, inner, or trailing with respect to any change groups. A wavefront is a leading wavefront, or a type I wavefront 602, if all of the migrateable wavefront activities come before any change groups 610, 612. A wavefront is a constrained wavefront, or a type II wavefront 604, if any wavefront activities are not migrateable. A wavefront is an inner wavefront, or a type III wavefront 606, if any of the migrateable wavefront activities fall between change groups 610, 612. A wavefront is a trailing wavefront, or a type IV wavefront 608, if all of the migrateable wavefront activities fall after any change group 610, 612.

When evaluating an instance, the migration manager 148 takes a wavefront snapshot. A type I wavefront is the ideal case from a migration point of view. The instance has not yet reached any of the model changes and the wavefront is compatible with the new process model. A type II wavefront includes one or more constrained activities which are not compatible with the new process model. While a constrained wavefront is not migrateable, the process may be migrateable at some point in the future.

A type III wavefront includes activities which fall between change groups. A migrated type III wavefront will have bypassed the preceding ΔC/ΔE change group, but will pick up the ΔH/ΔK changes. Note that in this scenario, the migrated instance's process model is a hybrid of the old and new process models. It is incumbent on the migration planning to correctly determine that the ΔC/ΔE change group is independent of the ΔH/ΔK change group. The flexibility that comes from allowing migration between change groups should be balanced against the need for a correct and complete migration plan.

Finally, a type IV wavefront is a trailing wavefront. All of the wavefront activities are after any changes. Since this type of wavefront does not pick up any model changes after migration it is treated as a special case. Depending on the run-time policy instances in this state are may not be migrated at all since they will behave identically with either model.

In general, there are two choices of migrateable process states: (1) node and (2) edge. The edge style migration is carried out on the transition between activities. The node style migration is carried out on those activities that can be suspended (e.g. a receive activity waiting for a message). There are tradeoffs between these two styles of migration. Node migration takes advantages of process idle time to migrate instances while they are idle. The migration evaluation and trigger can be performed outside the workflow engine (no engine changes are required). While node migration limits the set of potential migrateable activities to those which are suspendable (i.e. have an idle period), the large fraction of idle time in long running processes makes these activities an ideal migration window.

Edge migration, which attempts to migrate on the transition between activities, has a much larger pool of potentially migrateable activities. However, edge migration requires modifications to the workflow engine and much tighter integration with the migration logic in order to coordinate migration during activity transition. Also in order to deal with parallel flows an edge migration implementation will in practice also need to support node migration. The discussion below with respect to one or more embodiments of the present invention utilizes node migration, which allows the use of existing workflow engines without modification. However, other embodiments of the present invention can also utilize edge migration as well.

It should be noted that not every instance of a running process may need to be migrated. In some migration scenarios, only a sub-set of instances which match a certain criteria may need to be migrated. In order to facilitate this, the migration manager 148, in one embodiment, uses instance filtering to limit which instances are migrateable according to the value of a variable or variables unique to the specific instance being evaluated. In order to use instance filtering, a process variable or variables are selected, in one embodiment, at migration model creation time to serve as the filtering variable or variables. Since process variables may not be valid for every possible migration wavefront, the migration manager 148 identifies for which activities the filter variable or variables are valid. Dataflow analysis techniques can be used to identify the sub-set of activities for which the instance filtering variable or variables are valid and mark those activities with a filterable attribute.

One or more embodiments of the present invention are applicable to any type of workflow systems characterized by any type of migration attributes. On non-limiting example of a workflow system is a workflow system characterized by these four migration attributes (1) only a limited subset of allowed process states are migrateable; (2) at any given time only a fraction of the instances will be in a migrateable state; (3) the time required to complete migration of all instances is relatively long; and (4) there is a requirement to continue operation of the process while migration is pending.

Migration should minimize disruption to process availability. There are two scopes of availability which are to be considered (1) short term (minimize disruption during migration) and (2) long term (maintaining process availability pending migration). In the short term, during suspend/migrate/resume, there is a window during which the process is not available. Relative to the total process duration, this window is very short and the risk of collision with an external event at this time is low (but non-zero). The goal is to minimize the duration and impact of this unavailability window.

In the long term, the goal is to maintain, when possible, the availability of those instances which were not in a migrateable state when migration was attempted. This type of availability window while a process is pending migration can be very long, depending on the process lifetime and rate of change. The risk of collision of an external event is much more likely during this window. If the migration manager 148 maintains instance availability pending migration, the instance continues to run against the old model with the expectation that the instance will be migrated when it reaches a migrateable state at some point in the future.

However, it should be noted that not every migration scenario warrants continuous availability. In some cases, the risk of allowing un-migrated instances to continue to run may out-weigh the need to maintain availability. In this scenario instances that were not migrateable can be suspended or stopped. These suspended/stopped instances are then dealt with manually.

Migration Plan Creation

The following is a more detailed discussion on creating a migration plan 132. As discussed above, the migration manager 148 first determines migration constraints 128. In one embodiment, the migration manager 148 determines migration constraints 128 by comparing the source model 110 to the target model 112 via the model comparator 114. The delta analyzer 116, based on this comparison, identifies the differences 126 between the two (source and target) process models 110, 112. This comparison can be carried out across multiple dimensions (such as control-flow changes, data-flow changes, choreography changes, fine-grained activity attribute changes or other dimensions relevant to a specific workflow system). Each of these comparisons identifies a relevant difference between the two models 110, 112.

Each of the changes is then analyzed via the constraint generator 118 in turn to identify any change dependencies. Each individual change or change dependency group is a constraint 128 that constrains migration in a region of the source model 110, which corresponds to the change or change group. These change or change group constraints 128 are the input which is used to create a migration plan 132.

Figure 7:
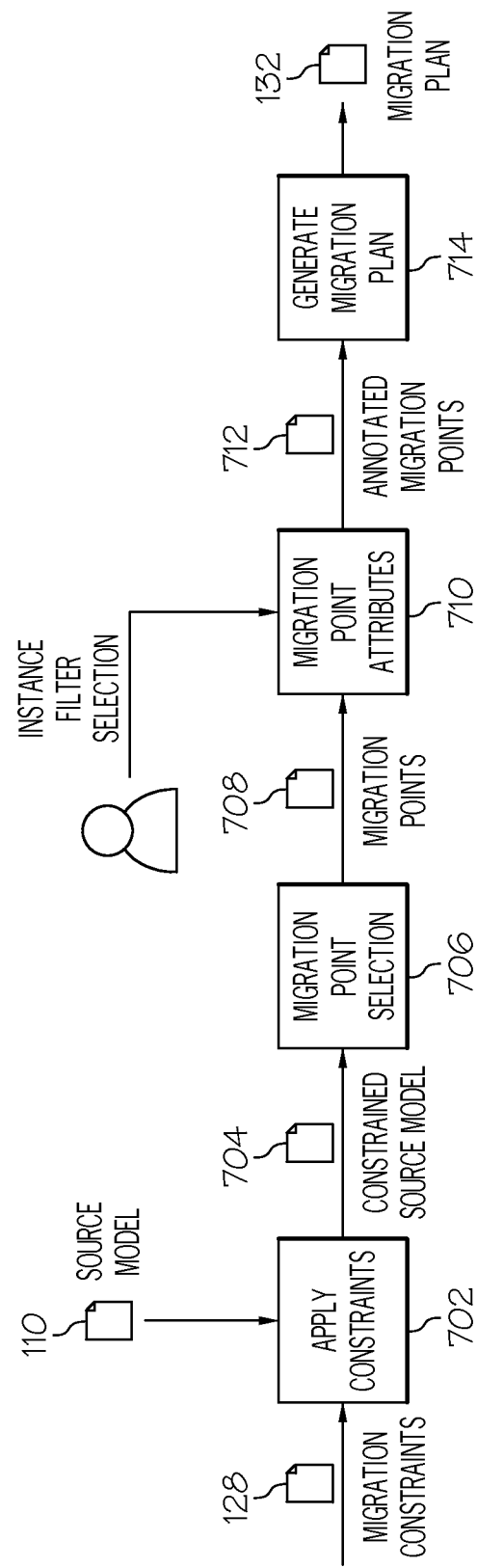
FIG. 7 illustrates an overview of generating a migration plan according to one embodiment of the present invention.

FIG. 7 shows an overview of the steps involved in generating a migration plan 132. Delta analysis produces a set of change dependencies. Each change dependency is a potential migration constraint which may eliminate a sequence of one or more activities as possible migration points. The migration manager 148 applies these change dependencies to the source model 110. A change dependency (such as delta C depends on delta A) is specified in the context of the differences between the two process models 110, 112, i.e., deltas 126. In one embodiment, the migration manager 148 applies each constraint 128, step 702, to the source model 110 by mapping the constraint endpoints to the matching source model activities and then propagates the constraint to all intervening activities which lie between the delta endpoints. In one embodiment, the migration manager 148 performs this mapping by creating a copy of the source map and annotates each activity as initially migrateable. The mapped endpoint activities of the constraint and all intervening activities are marked as non-migrateable. The source model 110 itself is used to identify the possible paths between the endpoints to propagate the constraint.

After applying all the known constraints to the source model 110 (constrained source model 704), migration point selection, at step 706, occurs and the remaining activities which are not marked as not-migrateable are the potential, unconstrained, migration points 708. Depending on the workflow system, a sub-set of activity types will be considered migration compatible. A migration approach which performed migration while an instance is suspended would be limited to migrating only those activity types which are suspendable. For example, BPEL implementations can suspend the Receive, Pick, Human Task, and Wait activities. This means that only activities of these four types are eligible as migration points in such a system. The potential unconstrained migration points are therefore filtered to exclude any activity types which are not a migrateable type.

After filtering, the remaining, non-excluded activities form the possible migration point set. For each migration point 708, the migration manager 148 determines, at step 710, the migration point's position relative to the model changes. Migration points which are before any change group are labeled as leading migration points; points which fall after all change groups are labeled as trailing; points which lie between change groups are marked as inner. If instance filtering has been defined for this migration plan, data-flow analysis is used to determine for each migration possible migration point, whether the instance filtering variable is valid for that activity; the migration point is marked as either filterable or not-filterable as appropriate. This process creates annotated migration points 712.

Then, the migration points, their positional and filterable attributes, the instance filtering data, and global plan data (such as the source and target process identification) are collected, at step 714, into a migration plan 132. This migration plan captures all the relevant model information and clearly defines exactly which activities in the source model 110 are possible migration points.

Orchestrating Migration

A continuous, long running, migration approach comprises four major functions: scheduling, orchestration, evaluation, and execution. Scheduling defines when and how often migration is attempted. Orchestration operates over the pool of instances, orchestrating the evaluation and execution activities. The evaluation phase examines a given instance and determines if that instance is currently in a migrateable state. Lastly execution actually carries out all the steps required to move an instance from one process model to another. The actual techniques of migrating an instance between process models (the Execution phase) is highly implementation dependent.

In the continuous migration model, migration takes place periodically during migration windows. During each window, the current pool of un-migrated instances is evaluated and those which are currently in a migrateable state are migrated. The migration administrator can decide when to schedule these migration windows. For a high priority migration the administrator may want the window to start immediately. In a heavily loaded system, the window may be moved to an off-shift time when more resources are available to handle migration.

After attempting to migrate an instance pool, some fraction of the old process instances may remain. An important factor to consider is when to retry migration. In other words, what is the optimal retry interval for a given process? Process durations can span many orders of magnitude—the retry interval for a process which runs for months is not the same as for a process which lasts hours. Selection of a migration retry interval is an example of process domain knowledge. The migration administrator uses this domain knowledge in selecting the scheduling policy settings.

Any process has migrateability windows that are opportunities when a process is in a migrateable state. They can vary greatly in duration, depending on many factors, but are characteristic of (1) the current state of the instance; (2) the natural period between events which change the process state; and (3) the flexibility of the migration plan. The retry interval is also strongly correlated with the natural period between events that change the process state. For example, a process with a natural period on the order of a day, might match with a daily retry interval. An optimal retry interval balances the migration overhead/opportunity trade off. A too-short interval means wasted overhead; a too long interval means wasted migration opportunities.

Other factors could also affect the selection of the retry interval. The migration priority could drive shorter/longer retry intervals. Off-shift migration times might drive retry intervals which are even multiples of days. The selection of the retry interval is an example of process domain knowledge which can be captured as scheduling policies. A long running migration task must eventually end. Terminating a migration task can result from three causes: all the instances have been migrated (success); administrator intervention; or expiration of the migration task. There may be scenarios when some fraction of the instances never reaches a migrateable state in a reasonable time. To limit the lifetime of the migration time, an expiration time can be defined (e.g. migration task can run for 2 weeks or migration ends by the last day of the month).

Figure 8:
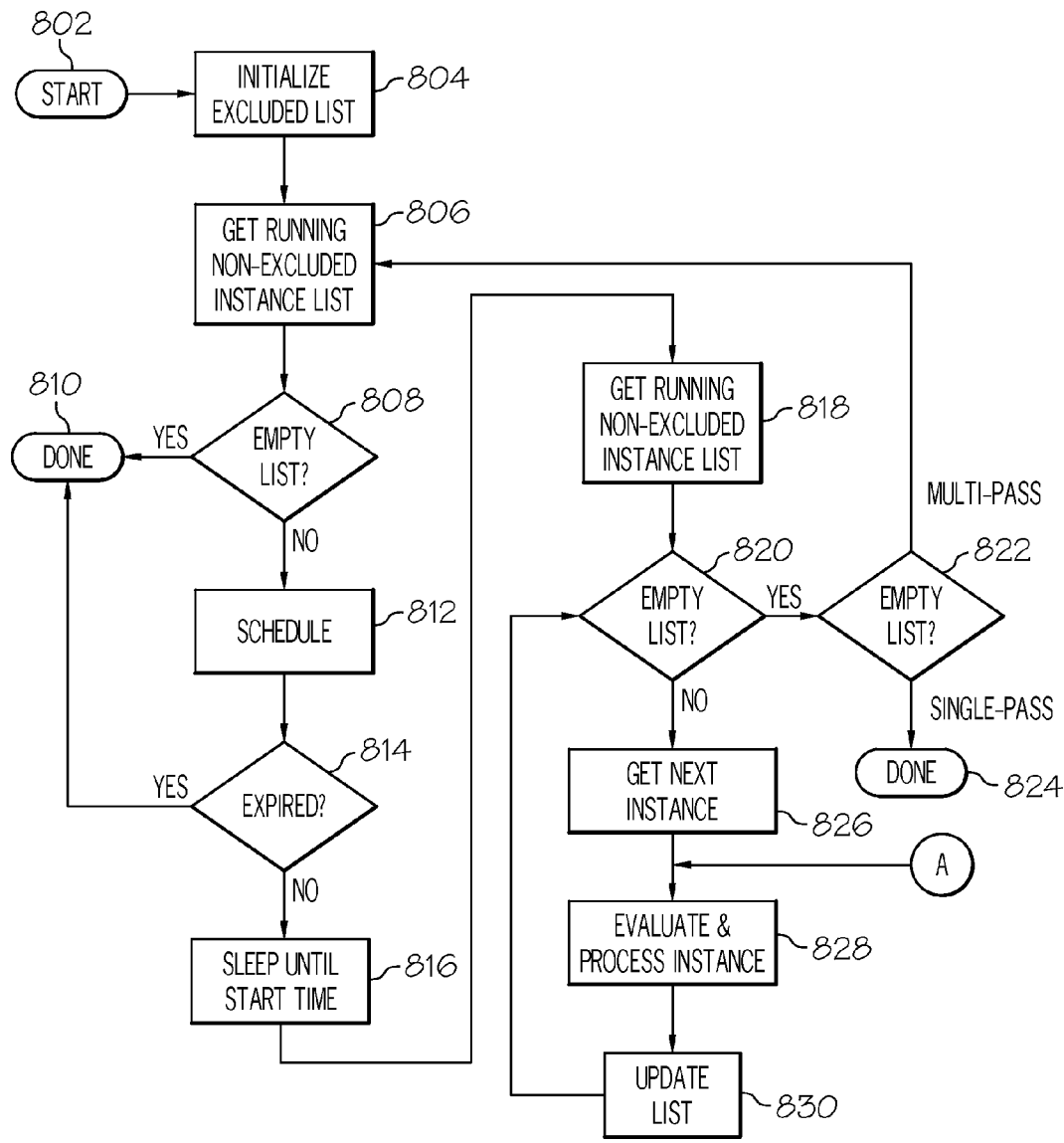
FIG. 8 is an operational flow diagram illustrating one example of orchestrating migration of workflow instances according to one embodiment of the present invention.

FIG. 8 shows illustrates one example of a migration orchestration flow. The operational flow of FIG. 8 begins at step 802 and flows directly to step 802. It should be noted that the basic structure is a loop that iterates over the instances, takes a snapshot of the instance state, and evaluates the migrateability of each instance and determines what action is appropriate for an instance. The migration manager 148 via the migration orchestrator 143 makes use of an exclude list of instances that are excluded from consideration for migration. This list can be empty at the start of a migration task, or it might include a sub-set of instance which is manually identified as excluded instances. During instance processing, if the migration manager 148 determines that an instance is to be excluded from future attempts at migration, it is added to this list. The list is maintained as an exclusion list 145 rather than an inclusion list because the process is continuing to run while the migration task is operating and instances may terminate before migration is attempted.

The migration manager 148, at step 804, initializes the excluded list. The migration manager 148, at step 806, retrieves a list of the currently running, non-excluded instances. The migration manager 148, at step 808, determines if this list is empty. If this list is empty then the migration is finished at step 810. If the list is not empty, the migration manager 148, at step 812, calculates the next time of the next migration window according to the scheduling policies 136 selected by the migration administrator. This may be immediately or it may be at some point in the future. At this point, the migration manager 148, at step 814, determines if the migration task has expired yet. If the task has expired, the migration is finished at step 810. If the task has not expired, the migration manager 148, at step 816, sleeps the migration task, if necessary, until the scheduled migration window start time.

Once the scheduled time (if any) has been reached, the migration manager 148, at step 818, again retrieves the current list of the running, non-excluded instances. This step is repeated because the pool of running instances may have changed while the migration task was waiting for the scheduled migration window to start. This list is then processed iteratively, processing each running instance. At the top of the loop, the migration manager 148, at step 820, checks if the list is empty (either because there were no more running non-excluded instances to process or because the loop has processed all the instances in the list). If the list is empty, the migration manager 148, at step 822, determines if a single pass policy is implemented. If so, the migration process is finished at step 824. If not, i.e., a multi-pass policy is implemented, the migration manager 148 starts the outer orchestration loop again (i.e., the control flow returns to step 806).

Figure 9:
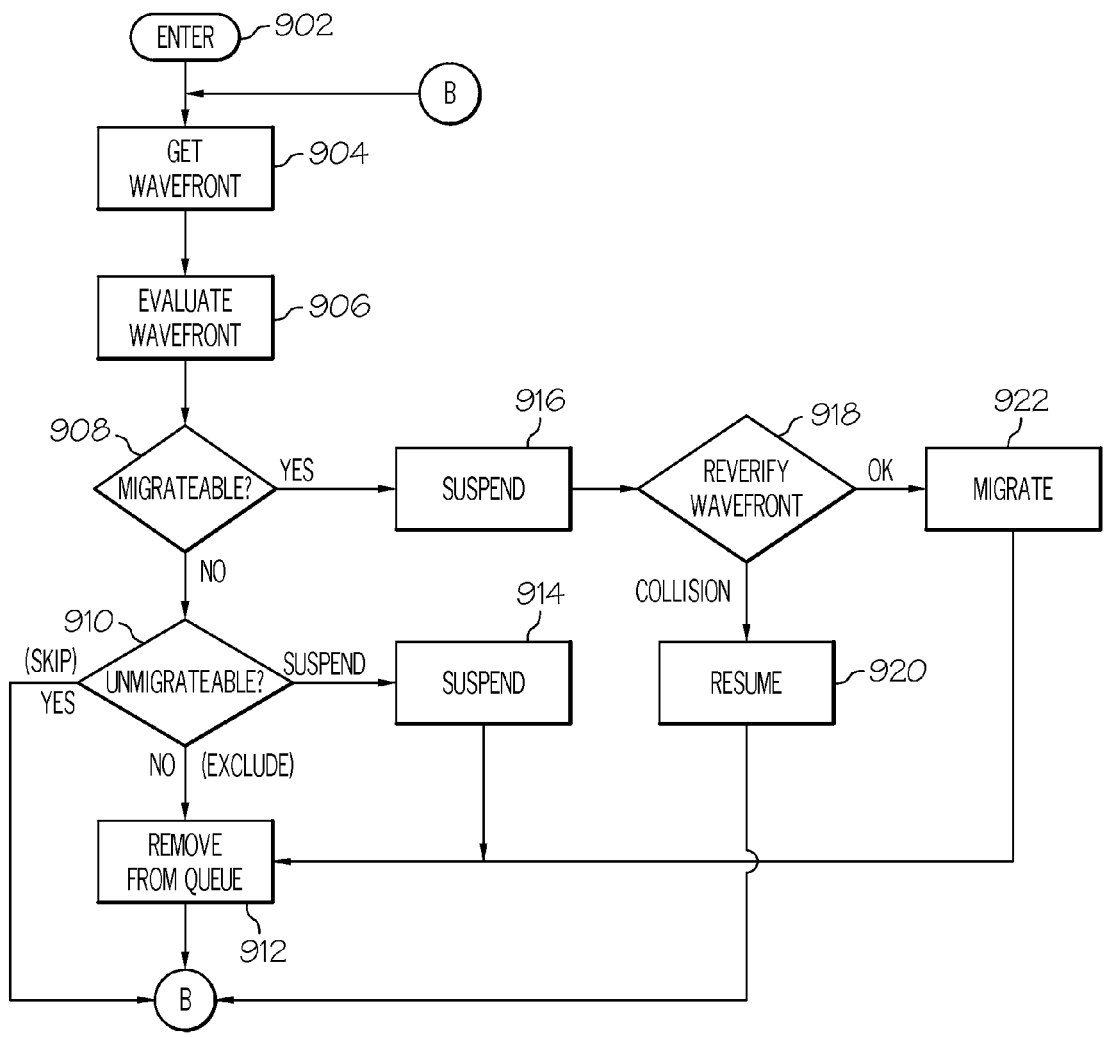
FIGS. 9 and 10 are operational flow diagrams illustrating various examples of processing an instance according to one embodiment of the present invention.
Figure 10:
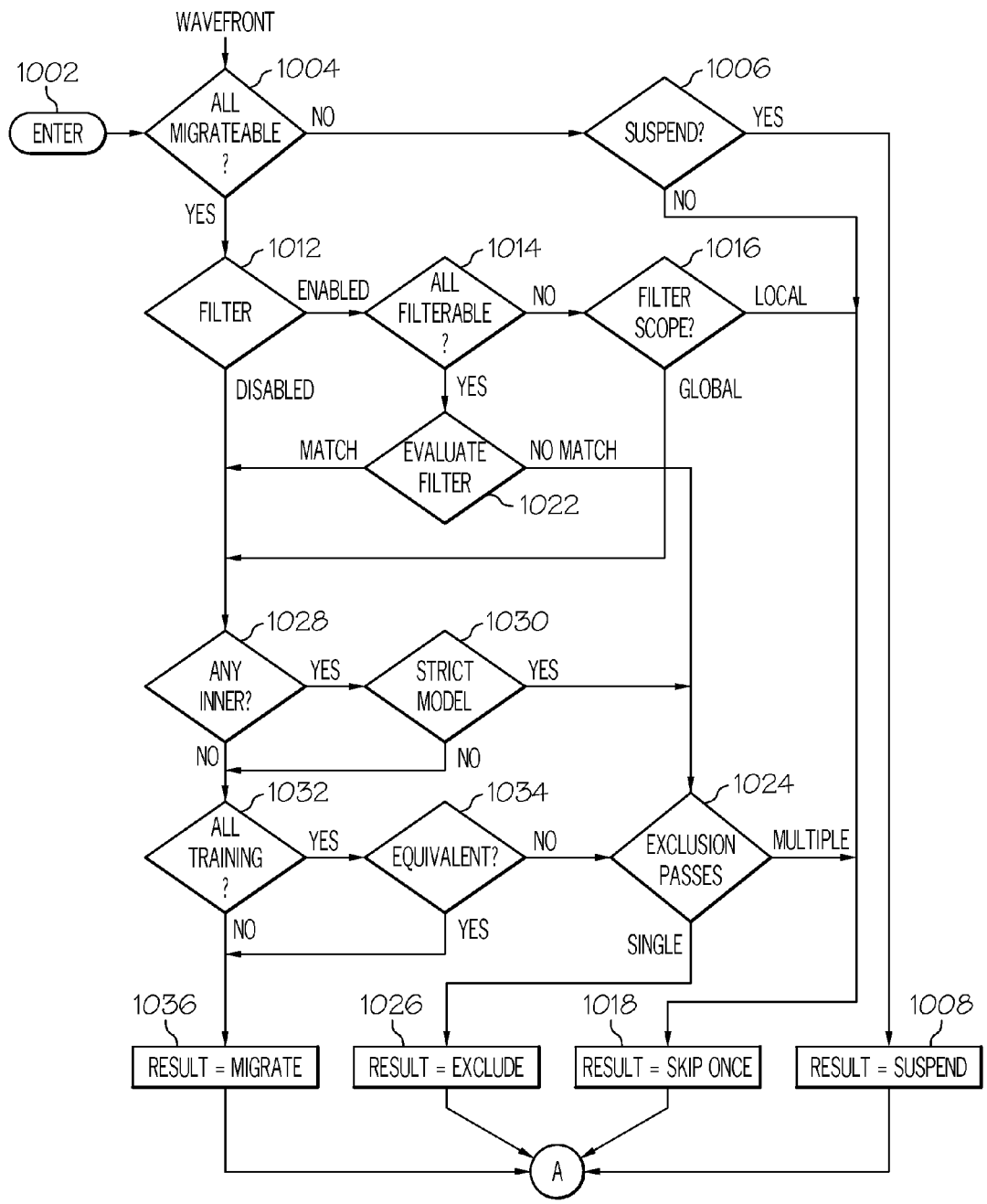

The single pass policy means that the migration manager 148 only makes a single pass through the running instances; the multiple pass policy means that the migration manager 148 will process the running processes multiple times until all instances are handled or the task expires. If the list is not empty, the migration manager 148, at step 826, obtains the next instance from the list and evaluates and processes the current instance at step 828. FIGS. 9 and 10 illustrate various examples for performing this evaluation and processing operation. Instance evaluation, in one embodiment, comprises analyzing any migration policies selected by an administrator and/or the migration manager 148, evaluating the migration plan 132, and analyzing the instance's current state via the wavefront of the instance. This results in a migration decision for the instance. The migration manager 148, at step 830, updates the list of instances to be analyzed for migration based on the evaluation and processing operation of step 828. For example, the current instance can be excluded from migration and, therefore, removed from the list, be determined as migrateable and subsequently removed from the list, etc. The control flow the returns to step 820.

FIGS. 9 and 10 illustrate various examples of processing an instance. The operational flow of FIG. 9 begins at step 902 and flows directly to step 904. The basic structure is a loop which iterates over the instances, takes a snapshot of the instance state and evaluates the migrateability of each instance. Instances which are not migrateable are skipped. Instances which are migrateable are migrated. Depending on policy choices, unmigrateable instances can be suspended or allowed to continue to run. Policy also specifies whether an unmigrated instance is excluded from future attempts.

The migration manager 148, at step 904, obtains the wavefront 147 associated with the instance to be processed. The migration manager 148, at step 906, evaluates the wavefront 147. The migration manager 148, at step 908, determines if the instance is migrateable. If the result of this determination is negative, then the migration manager 148, at step 910, determines if this instance should be skipped. If the result of this determination is positive, the migration manager 148 skips the instance and the control then flows to entry point B where processing is continued at step 904. If the result of this determination is negative, the migration manager 148, at step 912, excludes the instance from migration by removing the instance from the queue. The control then flows to entry point B where processing is continued at step 904. When determining whether to skip the instance, the migration manager 148 can also determine to suspend the instance at step 914. The control then flows to step 912.

Returning to step 908, if the migration manager 148 determines that the instance is migrateable then the migration manager 148, at step 916, suspends operation of the instance. It should be noted that there is a latency window between the time when the migration manager 148 takes the instance state snapshot, and the time when the migration manager 148 eventually attempts migration, during which it is possible for the instance state to have changed. For a long running process, the likelihood of collision of an external event with this latency window is low, but non-zero. To protect against this, if (and only if) the instance is migrateable the migration manager 148 adds an extra sequence after suspending operation of the instance. After suspending the instance, in anticipation of migrating it, the migration manager 148, at step 918, takes a second snapshot of the instance's wavefront and compares this with the first wavefront snapshot.

If these two wavefronts are not the same, then the migration manager 148 has detected an event collision and this instance is no longer known to be in a migrateable state. The instance, at step 920, is resumed and it can be re-evaluated at some point in the future. If the two snapshots match then migration, at step 922, is carried out on the suspended instance and the instance is removed from the queue at step 912. The alternative of suspending before every evaluation, in some embodiments, is not warranted given the low likelihood of an event collision and the desire to maximize process availability. Since the additional overhead of taking the second snapshot and the compare is small and is only carried if the process instance passes the evaluation screening this approach minimizes the cost of collision detection.

It should be noted that at evaluation time, determining whether any given instance is migrateable, in one embodiment, rests on three pillars (1) the current state of the process instance, (2) the model knowledge embodied in the migration plan, and (3) any applicable migration policies that can shape the migration decision. The migration plan 132, created at modeling time, captures the process model and process migration knowledge. The migration administrator can specify the migration policies 136 to fine tune the migration behavior. The wavefront 147 captures the current state of the process instance. The migration manager 148 via the instance evaluator 144 leverages these three data sets to evaluate the migrateability of any process instance.

FIG. 10 shows one example of an instance evaluation flow. The operational flow diagram of FIG. 1o begins at step 1002 and flows directly to step 1004. Given a wavefront 147 the migration manager 148, at step 1004, verifies that all the wavefront activities are migrateable. If the result of this decision is negative, the migration manager 148, at step 1006, determines whether to suspend the migration process. If the result of this determination is positive, the migration process is determined to be suspended at step 1008. The control flow then flows to entry point A of FIG. 8 where this suspending process is performed. The unmigrateable policy can be used to automatically suspend instances which cannot be migrated. The control flow then flows to entry point A of FIG. 8. If the result of this determination is negative, the migration manager 148, at step 1018, determines that the instance is to be skipped once and the control flows to entry point A of FIG. 8, where this skipping operation is performed.

If the wavefront 147 is potentially migrateable, the migration manager 148 applies various run-time policies to provide finer grained migration control. The output of the evaluation algorithm is one of four outcomes: migrate, suspend, skip, or exclude. For example, the migration manager 148, at step 1012, determines whether to apply filtering operations. If filtering operations are to be applied the control flows to step 1014. If filtering operations are not applied the control flows to step 1028. The filtering logic allows the migration manager 148 to migrate only a subset of the instances (e.g. only gold customers or only those instances with a credit score below a given threshold). To support filtering, the migration developer chooses a process variable to use as the filter variable. At run-time the migration administrator can enable or disable filtering and can supply the filter threshold value and the filter condition (e.g. equal to "gold" or below 400).

Since the filter function is a function of a variable or parameter of the process model, the migration manager 148 accommodates wavefront scenarios and determines whether the filtering variable is valid or invalid. An invalid filtering variable may not yet be defined or may not yet be initialized. Activities in the process model for which the filtering variable is valid were marked with a filterable attribute at model time. Filterable activities support instance filtering.

The migration manager 148, at step 1014, determines if all the activities where filterable. If the result of this determination is negative, determines whether the filter scope is local or global. If the filter scope is local the migration manager, at step 1018, determines that the instance is to be skipped one time. The control flow then flows to entry point A of FIG. 8 where the skipping process is performed. If the filter scope is global then the control flows to step 1028. The filter scope (global/local) determines the behavior of non-filterable activities when filtering is enabled. If the scope is set to local, only filterable activities are migrateable (if the filter matches); non-filterable activities are not migrateable. The global filter scope means that while filterable activities are migrateable only if the filter matches, non-filterable activities are always migrateable.

For example, instance variables in workflows typically have scopes or regions of the workflow where they are defined and/or valid. As an example, if the fourth activity in a workflow initializes the x variable, then for the first three activities the x variable is not defined. If the x variable is to be used for filtering instances then an undefined state occurs for those first activities and any other activity for which the variable is not valid. The migration manager 148, in one embodiment, manages this situation by first determining if all the activities are annotated as filterable in the migration plan 132. In other words, the migration manager 148 determines if the instance filtering variable(s) are all valid for all the activities in the wavefront 147.

If the filter scope is local than the migration manager 148 only attempts to migrate activities for which the instance filter can be evaluated for (e.g., if only the gold customers are to be migrated and not silver or bronze and it is unknown if an instance belongs to a gold customer then the migration manager 148 waits until it reaches the point in the process where the customer type variable has been defined.) If however, the migration manager 148 is to migrate all instances where the customer type is unknown (e.g. early in the process) and only limit migration for the scope of the process where the instance filtering variable(s) are defined the global filter policy can be used. The global filter policy, in one embodiment, indicates that if all the activities in the wavefront 147 are annotated as filterable then the filter is evaluated and used to control the decision. If any of the activities in the wavefront 147 are not filterable and the global policy is set then the evaluation ignores instance filtering and makes the migration decision as if filtering was disable.

Returning to step 1014, if the result of this determination is positive, the migration manager 148, at step 1022 evaluates the filter. For example, as discussed above, an administrator (or the migration manager 148 itself) can select one or more instance variables to be the filter variables and migration points are filtered based on these filter variables if the migration points are annotated in the migration plan 132 as filterable. If the filter matches then the control flows to step 1028. If the filter does not match then the migration manager at step 1024 determines if the exclusion for this instance is a multiple or single pass, as discussed above with respect to FIG. 8. If the exclusion pass is a single pass then the migration manager 148, at step 1026, determines that the instance is to be excluded from migration and the control flow then flows to entry point A of FIG. 8. The evaluation process of step 828 in FIG. 8 can then perform the exclusion operation. The exclusion policy determines what happens to instances which fail one of the wavefront tests; if a single exclusion the instance is excluded from future migration attempts. If the exclusion pass is a multiple pass then the control flows to step 1018 where the instance is determined to only be skipped once. The control flow then flows to entry point A of FIG. 8 where the skipping operation can be performed.

The migration manager 148, at step 1028, determines if any of the activities are inner activities. If the result of this determination is positive, then the migration manager 148, at step 1030, determines whether a strict model is to be used. For example, based on FIG. 6, there are four changes which create two constraint groups in the initial model. If type I activities such as activity B are migrated then the migrated instance will operate an A-M sequence. The A-M sequence is identical to the new workflow instance since A and B in the initial workflow model are not changed relative to the new workflow model. Similarly, for type IV instances, migrated at L or M will operate an A-M sequence identical to the old model. Both of these scenarios fall into the strict model, because for these cases all instances will behave according to the initial or the new workflow model. However type III instances will have executed some activities in the old model before migration that are changed in the new model. Thus, the sequence of these instances will be neither the initial nor the new workflow model, but instead some hybrid of the two. This is the relaxed case. In the strict case, the migration manager 148 assures that the path of every migrated instance follows one of the defined workflow models; in the relaxed case the migration manager 148 allows migrated instances to operate a hybrid of the two models, while still obeying any change constraints between the two models.

Returning to FIG. 10, if a strict model is to be used then the control flows to step 1024. If a strict model is not used then the control flows to step 1032. The migration manager 148, at step 1032 determines if all of the activities are trailing activities. Instances that have passed all model change groups will behave the same whether they are migrated or not. Depending on the equivalent migration policy, migrating trailing wavefronts can be selectively enabled or disabled. If all of the activities are trailing activities then the migration manager 148, at step 1034, determines if they are equivalent.

For example, based on FIG. 6, activities L and M are trailing activities (type IV); that is they fall after all changes between the initial and new workflow models. Since these activities are after all the changes, trailing instances behave no differently before or after migration. Since there is not a new model benefit to migrating these instances the migration manager 148 can use a policy to decide whether to migrate these instances or not. If equivalent migration is enabled then trailing instances are migrateable, if disabled they are not. For example, if an administrator wants to consolidate resources by removing the initial workflow model then all the instances are migrated including trailing ones and equivalent Migration is set to true. If an administrator wants to migrate to pick up a change in the model and does not care about removing the old workflow model then equivalent Migration is disabled. Thus, only those instances that pick up changes in the new model are migrated. Trailing instances then run to completion against the initial model.

Returning to FIG. 10, if the activities are not equivalent, the control flows to step 1024. If the activities are equivalent, the control flows to step 1036. If all of the activities are not trailing activities, the migration manager 148, at step 1036, determines that the instance is to be migrated. The control flow then flows to entry point A of FIG. 8.

As can be seen from the discussion above, one or more embodiments of the present invention provide a processes migration model as a policy driven continuous, long running, process. The data necessary to evaluate whether any instance is currently migrateable at model creation time is captured and conveyed to the run-time environment in a migration plan. A migration administrator can define migration policies, which configure the continuous migration process. The continuous migration model explicitly addresses the four main problems of managing migration: scheduling, orchestration, evaluation, and execution. Designing migration as a continuous process itself enables process instance migration to be performed across models; maintain continuous process availability; and deliver a powerful, flexible migration model which can deal with a broad range of migration scenarios. Using a policy model to fine tune the run-time migration behavior means that the same model's migration plan can be reused as migration requirements change over time.

Information Processing System

Figure 11:
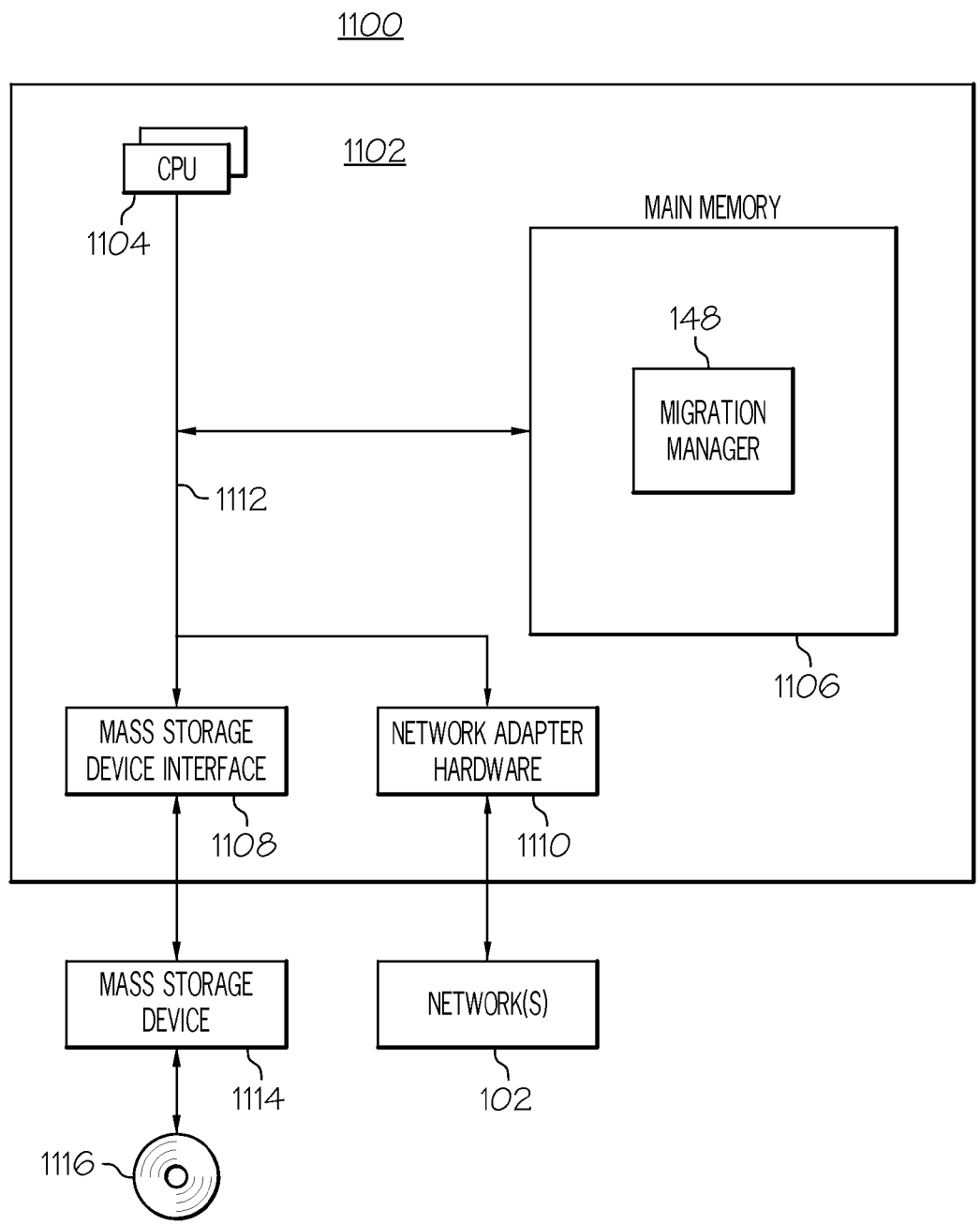
FIG. 11 is a block diagram illustrating a detailed view of an information processing system according to one embodiment of the present invention.

FIG. 11 is a block diagram illustrating detailed view an information processing system 1100 according to one embodiment of the present invention. The information processing system 1100 can be any one of the information processing systems 104, 106, 108 in FIG. 1 and can comprise any of the components discussed above with respect to these systems. The information processing system 1100 is based upon a suitably configured processing system adapted to implement one or more embodiments of the present invention. Any suitably configured processing system is similarly able to be used as the information processing system 1100 by embodiments of the present invention.

The information processing system 1100 includes a computer 102. The computer 102 has a processor(s) 1104 that is connected to a main memory 106, mass storage interface 1108, and network adapter hardware 1110. A system bus 1112 interconnects these system components. The mass storage interface 1108 is used to connect mass storage devices, such as data storage device 1114, to the information processing system 1100. One specific type of data storage device is an optical drive such as a CD/DVD drive, which may be used to store data to and read data from a computer readable medium or storage product such as (but not limited to) a CD/DVD 1116. Another type of data storage device is a data storage device configured to support, for example, NTFS type file system operations.

The main memory 1106, in one embodiment, comprises the migration manger 148 at least a portion of the migration manager 148, as discussed above. Although illustrated as concurrently resident in the main memory 1106, it is clear that respective components of the main memory 1106 are not required to be completely resident in the main memory 1106 at all times or even at the same time. In one embodiment, the information processing system 1100 utilizes conventional virtual addressing mechanisms to allow programs to behave as if they have access to a large, single storage entity, referred to herein as a computer system memory, instead of access to multiple, smaller storage entities such as the main memory 1106 and data storage device 1116. Note that the term "computer system memory" is used herein to generically refer to the entire virtual memory of the information processing system 1100.

Although only one CPU 1104 is illustrated for computer 1102, computer systems with multiple CPUs can be used equally effectively. Various embodiments of the present invention further incorporate interfaces that each includes separate, fully programmed microprocessors that are used to off-load processing from the CPU 404. An operating system (not shown) included in the main memory is a suitable multitasking operating system such as the Linux, UNIX, Windows XP, and Windows Server 2003 operating system. Various embodiments of the present invention are able to use any other suitable operating system. Some embodiments of the present invention utilize architectures, such as an object oriented framework mechanism, that allow instructions of the components of operating system (not shown) to be executed on any processor located within the information processing system 1100. The network adapter hardware 1110 is used to provide an interface to one or more networks 102. Various embodiments of the present invention are able to be adapted to work with any data communications connections including present day analog and/or digital techniques or via a future networking mechanism.

Although the exemplary embodiments of the present invention are described in the context of a fully functional computer system, those skilled in the art will appreciate that embodiments are capable of being distributed as a program product via CD or DVD, e.g. CD 1116, CD ROM, or other form of recordable media, or via any type of electronic transmission mechanism.

NON-LIMITING EXAMPLES

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

Although the various example embodiments of the present invention have been discussed in the context of a fully functional computer system, those of ordinary skill in the art will appreciate that various embodiments are capable of being distributed as a program product via CD or DVD, e.g. CD 124, CD ROM, or other form of recordable media, or via any type of electronic transmission mechanism.

What is claimed is:

1. A computer implemented method for managing workflow instance migration, the computer implemented method comprising:

comparing, with a migration manager communicatively coupled to a memory and a processor on an information processing system, an initial workflow process model with a new workflow process model;

determining a set of differences between the initial workflow process model and the new workflow process model;

identifying, with the migration manager, based on the set of differences, at least one set of a plurality of activities associated with the initial workflow process model that is migrateable to the new workflow process model; and generating a migration plan associated with the initial workflow process model and the new workflow process model, wherein the migration plan comprises the at least one set of the plurality of activities associated with the initial workflow process model that is migrateable to the new workflow process model; and wherein the identifying further comprises:

identifying, with the migration manager, a set of migration constraints based on the set of differences, wherein the set of migration constraints identifies at least one set of a plurality of activities in the initial workflow process that are non-migrateable to the new workflow process model; and identifying, with the migration manager, based on the set of migration constraints, the at least one set of a plurality of activities that is migrateable to the new workflow process model; and wherein identifying the set of migration constraints further comprises:

identifying at least one set of a plurality of activities within the initial workflow process model associated with each migration constraint in the set of migration constraints;

identifying, for each of the at least one set of a plurality of activities, a first activity in the set of activities and a last activity in the set of activities;

annotating, for each of the at least one set of a plurality of activities, the first activity, the last activity, and all intervening activities as non-migrateable with respect to the new workflow process model;

identifying at least one remaining set of a plurality of activities within the initial workflow process model that has not been annotated as non-migrateable; and identifying the at least one remaining set of the plurality activities as a set of migration points for the new workflow process model, wherein the at least one remaining set of a plurality of activities is identified as the at least one set of a plurality activities that is migrateable to the new workflow process model; and wherein identifying the at least one remaining set of a plurality of activities further comprises:

determining an activity type associated with each migration point in the set of migration points;

identifying, based on the determining, a subset of the set of migration points comprising an activity type that fails to be a migrateable activity type; and removing the subset of migration points from the set of migration points creating a new set of migration points; and determining, for each migration point in the new set of migration points, (1) a position of the migration point within the initial workflow process model relative to each set of the plurality of activities associated with each difference, and (2) whether the migration point is filterable; and wherein the migration plan comprises at least the new set of migration points, the position of each migration point in the new set of migration points, and a marking of each migration point as filterable or not-filterable, wherein the at least one set of a plurality of activities that is migrateable to the new workflow process model is associated with the new set of migration points.

2. An information processing system for managing workflow instance migration, the information processing system comprising:

a memory;

a processor communicatively coupled to the memory; and a migration manger communicatively coupled to the memory and the processor, wherein the migration manager is configured for:

comparing, with a processor, an initial workflow process model with a new workflow process model;

determining a set of differences between the initial workflow process model and the new workflow process model;

identifying, based on the set of differences, at least one set of a plurality of activities associated with the initial workflow process model that is migrateable to the new workflow process model; and generating a migration plan associated with the initial workflow process model and the new workflow process model, wherein the migration plan comprises the at least one set of the plurality of activities associated with the initial workflow process model that is migrateable to the new workflow process model; and wherein the identifying further comprises:

identifying a set of migration constraints based on the set of differences, wherein the set of migration constraints identifies at least one set of the plurality of activities in the initial workflow process that is non-migrateable to the new workflow process model; and identifying, based on the set of migration constraints, the at least one set of the plurality of activities that is migrateable to the new workflow process model; and wherein identifying the set of migration constraints further comprises:

identifying at least one set of the plurality of activities within the initial workflow process model associated with each migration constraint in the set of migration constraints;

identifying, for each of the at least one set of a plurality of activities, a first activity in the set of activities and a last activity in the set of activities;

annotating, for each of the at least one set of a plurality of activities, the first activity, the last activity, and all intervening activities as non-migrateable with respect to the new workflow process model;

identifying at least one remaining set of a plurality of activities within the initial workflow process model that has not been annotated as non-migrateable; and identifying the at least one remaining set of a plurality of activities as a set of migration points for the new workflow process model, wherein the at least one remaining set of activities is identified as the at least one set of a plurality of activities that is migrateable to the new workflow process model; and wherein identifying the at least one remaining set of a plurality of activities further comprises:

determining an activity type associated with each migration point in the set of migration points;

identifying, based on the determining, a subset of the set of migration points comprising an activity type that fails to be a migrateable activity type; and removing the subset of migration points from the set of migration points creating a new set of migration points; and determining, for each migration point in the new set of migration points, (1) a position of the migration point within the initial workflow process model relative to each set of the plurality of activities associated with each difference in the set of differences, and (2) whether the migration point is filterable; and wherein the migration plan comprises at least the new set of migration points, the position of each migration point in the new set of migration points, and a marking of each migration point as filterable or not-filterable, wherein the at least one set of the plurality of activities that is migrateable to the new workflow process model is associated with the new set of migration points.

3. A computer implemented method for managing workflow instance migration, the computer implemented method comprising:

comparing, with a migration manager communicatively coupled to a memory and a processor on an information processing system, an initial workflow process model with a new workflow process model;

determining, with the migration manager, a set of differences between the initial workflow process model and the new workflow process model;

identifying, with the migration manager, a set of migration constraints based on the set of differences;

identifying, with the migration manager, based on the set of migration constraints, at least one set of a plurality of activities that is migrateable to the new workflow process model as at least one set of migration points for the new workflow process model;

identifying, with the migration manager, at least one activity type which is suspendable in the initial workflow process model;

determining, with the migration manager, whether each of the at least one set of migration points comprises an activity that is one of a suspendable activity type and not a suspendable activity type; and generating a migration plan associated with the initial workflow process model and the new workflow process model, wherein the migration plan comprises the at least one set of migration points for the new workflow process model, and a marking of each migration point in the at least one set of migration points as one of instance filterable or instance not-filterable based on at least the determination of whether the each migration point comprises an activity that is one of a suspendable activity type and not a suspendable activity type.

4. An information processing system for managing workflow instance migration, the information processing system comprising:

a memory;

a processor communicatively coupled to the memory; and a migration manger communicatively coupled to the memory and the processor, wherein the migration manager is configured for:

comparing, with the processor, an initial workflow process model with a new workflow process model;

determining, with the migration manager, a set of differences between the initial workflow process model and the new workflow process model;

identifying, with the migration manager, a set of migration constraints based on the set of differences;

identifying, with the migration manager, based on the set of migration constraints, at least one set of a plurality of activities that is migrateable to the new workflow process model as at least one set of migration points for the new workflow process model;

identifying, with the migration manager, at least one activity type which is suspendable in the initial workflow process model;

determining, with the migration manager, whether each of the at least one set of migration points comprises an activity that is one of a suspendable activity type and not a suspendable activity type; and generating a migration plan associated with the initial workflow process model and the new workflow process model, wherein the migration plan comprises the at least one set of migration points for the new workflow process model, and a marking of each migration point in the at least one set of migration points as one of instance filterable or instance not-filterable based on at least the determination of whether the each migration point comprises an activity that is one of a suspendable activity type and not a suspendable activity type.

\* \* \* \* \*